United States Patent
Wang et al.

(10) Patent No.: US 11,790,111 B2
(45) Date of Patent: Oct. 17, 2023

(54) VERIFIABLE CONSENT FOR PRIVACY PROTECTION

(71) Applicant: Google LLC, Mountain View, CA (US)

(72) Inventors: Gang Wang, Jersey City, NJ (US); Marcel M. Moti Yung, New York, NY (US)

(73) Assignee: Google LLC, Mountain View, CA (US)

( * ) Notice: Subject to any disclaimer, the term of this patent is extended or adjusted under 35 U.S.C. 154(b) by 396 days.

(21) Appl. No.: 17/286,626

(22) PCT Filed: Oct. 1, 2020

(86) PCT No.: PCT/US2020/053697
§ 371 (c)(1),
(2) Date: Apr. 19, 2021

(87) PCT Pub. No.: WO2021/080757
PCT Pub. Date: Apr. 29, 2021

(65) Prior Publication Data
US 2021/0350021 A1 Nov. 11, 2021

Related U.S. Application Data

(60) Provisional application No. 62/924,059, filed on Oct. 21, 2019.

(51) Int. Cl.
*G06F 21/62* (2013.01)
*H04L 9/30* (2006.01)
*H04L 9/32* (2006.01)

(52) U.S. Cl.
CPC ............ *G06F 21/6245* (2013.01); *H04L 9/30* (2013.01); *H04L 9/3213* (2013.01); *H04L 9/3247* (2013.01)

(58) Field of Classification Search
CPC ..... G06F 21/6245; H04L 9/30; H04L 9/3213; H04L 9/3247
See application file for complete search history.

(56) References Cited

U.S. PATENT DOCUMENTS 7,478,434 B1 1/2009 Hinton et al.
8,752,203 B2 * 6/2014 Reinertsen .............. G06F 21/10
726/28

(Continued)

OTHER PUBLICATIONS

International Preliminary Report on Patentability in International Appln. No. PCT/US2020/053697, dated May 5, 2022, 11 pages.

(Continued)

*Primary Examiner* — Viral S Lakhia
(74) *Attorney, Agent, or Firm* — Fish & Richardson P.C.

(57) ABSTRACT

Methods, systems, and apparatus, including a method for updating user consent in a verifiable manner. In some aspects, a method includes receiving, from a client device, a request including an attestation token. The attestation token includes a set of data that includes at least a user identifier that uniquely identifies a user of the client device, a token creation time that indicates a time at which the attestation token was created, user consent data specifying whether one or more entities that receive the attestation token are eligible to use data of the user, an action to be performed in response to the request. The attestation token also includes a digital signature of at least a portion of the set of data, including at least the user identifier and the token creation time. An integrity of the request is verified using the attestation token.

20 Claims, 7 Drawing Sheets

(56) References Cited

U.S. PATENT DOCUMENTS

| | | | |
|---|---|---|---|
| 9,531,540 B2* | 12/2016 | Peeters | H04L 9/302 |
| 9,642,173 B2* | 5/2017 | Granbery | G06Q 20/3224 |
| 10,615,960 B2* | 4/2020 | Zhang | H04L 9/3218 |
| 10,790,980 B2* | 9/2020 | Camenisch | H04L 9/08 |
| 11,121,876 B2* | 9/2021 | Haldar | H04L 9/3228 |
| 2011/0030045 A1 | 2/2011 | Beauregard et al. | |
| 2019/0007212 A1 | 2/2019 | Neve De Mevergnies et al. | |
| 2019/0081943 A1 | 3/2019 | Yamanakajima et al. | |
| 2019/0319794 A1* | 10/2019 | Haldar | H04L 9/3226 |
| 2021/0040053 A1* | 2/2021 | Masuda | C07D 487/04 |
| 2021/0224333 A1* | 7/2021 | Shrinivasan | H04L 9/0637 |
| 2021/0320922 A1* | 10/2021 | Furhmann | G06Q 20/385 |
| 2022/0156721 A1* | 5/2022 | Jurov | G06F 21/64 |
| 2022/0239483 A1* | 7/2022 | Sugarev | H04L 9/3247 |

OTHER PUBLICATIONS

Office Action in European Appln. No. 20792890.4, dated Jun. 7, 2022, 5 pages.

Office Action in Indian Appln. No. 202127017829, dated May 25, 2022, 5 pages (with English translation).

Auth0.com [online], "Get Started with JSON Web Tokens," May 2019, retrieved on Apr. 21, 2021, retrieved from URL<https://auth0.com/learn/json-web-tokens/>, 10 pages.

PCT International Search Report and Written Opinion in International Appln. No. PCT/US2020/053697, dated Dec. 11, 2020, 18 pages.

* cited by examiner

VERIFIABLE CONSENT FOR PRIVACY PROTECTION

CROSS-REFERENCE TO RELATED APPLICATIONS

This application is a National Stage Application under 35 U.S.C. § 371 and claims the benefit of International Application No. PCT/US2020/053697, filed Oct. 1, 2020, which claims priority to U.S. Application No. 62/924,059, filed Oct. 21, 2019, entitled VERIFIABLE CONSENT FOR PRIVACY PROTECTION. The disclosures of the foregoing applications are incorporated herein by reference.

BACKGROUND

A browser cookie is a small amount of data stored on a user device by a web browser. Browser cookies can be used for many purposes, including storing stateful information, authenticating users, and recording browsing activity. There are several types of cookies, including first-party cookies and third-party cookies. A first-party cookie is a cookie that is created and/or accessed by a domain that a user views directly, i.e., the domain viewable in the address bar of the browser. In contrast, a third-party cookie is a cookie that is created and/or accessed by a different domain than the one viewable in the address bar.

SUMMARY

This specification describes technologies relating to updating user consent settings for user data collection and usage based on user input such that the user consent is technically verifiable.

In general, one innovative aspect of the subject matter described in this specification can be embodied in methods that include receiving, from a client device, a request including an attestation token, the attestation token including: a set of data that includes at least: a user identifier that uniquely identifies a user of the client device; a token creation time that indicates a time at which the attestation token was created; user consent data specifying whether one or more entities that receive the attestation token are eligible to use data of the user; and an action to be performed in response to the request; and a digital signature of at least a portion of the set of data, including at least the user identifier and the token creation time; and verifying an integrity of the request using the attestation token, including: determining whether the token creation time is within a threshold duration of a time at which the request was received; determining, using the digital signature, whether the set of data was modified after the attestation token was created; and determining that the integrity of the request is valid based at least on determination that the token creation time is within the threshold duration of the time at which the request was received and a determination that the set of data has not been modified since the attestation token was created; and performing the action in response to determining that the integrity of the request is valid. Other implementations of this aspect include corresponding apparatus, systems, and computer programs, configured to perform the aspects of the methods, encoded on computer storage devices.

These and other implementations can each optionally include one or more of the following features. In some aspects, performing the action includes determining that the user consent data indicates that the data of the user is to be deleted and deleting the data of the user.

In some aspects, performing the action includes determining that the user consent data specifies one or more authorized actions that are authorized by the user to be performed by a given entity using the data of the user and preventing the given entity from using the data of the user for actions other than the specified one or more authorized actions.

In some aspects, the set of data includes payload data that includes the user consent data. The payload data can include a domain to which the action applies. Some aspects can include determining that the action is a user consent action to modify previous consent given by the user for the domain to use the data of the user.

In some aspects, the set of data includes payload data that includes the user consent data. The payload data can include a domain to which the action applies. Some aspects can include determining that the action is a request for one or more digital components, selecting the one or more digital components in accordance with the user consent data, and providing the one or more digital components to the client device.

In some aspects, the digital signature is a signature of the user identifier, the token creation time, and the payload. In some aspects, the set of data includes at least one of a device integrity token or a browser integrity token.

In some aspects, the one or more entities includes multiple recipient entities to which the request is provided and the user consent data includes, for each recipient entity, an encrypted consent element that includes user consent data specific to the recipient entity, wherein the encrypted consent element for each recipient entity is encrypted using a public key of the recipient entity.

Some aspects includes receiving a second request that includes a second user identifier and a second token creation time, determining that the second user identifier of the second request matches the user identifier of the request, determining that the second token creation time of the second request matches the token creation time of the request, and in response to determining that the second user identifier of the second request matches the user identifier of the request and that the second token creation time of the second request matches the token creation time of the request, determining that either the second request is a duplicate of the request or a replay attack has occurred.

The subject matter described in this specification can be implemented in particular embodiments so as to realize one or more of the following advantages. Using attestation tokens described in this document to communicate user consent settings to other entities ensures that the user consent settings were received from the user and enables the entities to technically verify the user's consent. The attestation tokens use digital signature schemes to prevent entities from falsifying users' consent, thereby preserving data security. The attestation tokens securely link user identifiers with user data and with user consent settings such that the entities that receive the user data can verify the user's consent to use the user data in accordance with the user consent. In this way, a user is provided with a mechanism in which they can manage their data in a secure way when dealing with multiple entities.

Client devices can send the attestation tokens with expiration dates each time user consent settings are modified and/or prior to expiration to establish a continuous chain of user consent settings. This prevents entities from ignoring user requests for entities to delete the user's data or stop using the data in specified ways. Client devices can require a response from recipients of the attestation tokens to further verify receipt of user consent settings and prevent the recipient entities from ignoring the user requests.

The use of attestation tokens as described in this document enable third-party auditors to verify that user data is only being used in accordance with the consent of the users. This gives users the ability to manage how other entities collect and use their data and prevents entities from using the data improperly. This also protects entities that use such data properly by giving the entities a means to verify in a trusted manner the consent that they were given to collect and use the data.

The use of attestation tokens as described in this document also enables users to easily and securely manage how their data is collected and used. For example, the techniques described in this document enable a user to change consent settings that apply to many different entities from a single user interface rather than having to manage consent settings individually for each entity.

Various features and advantages of the foregoing subject matter is described below with respect to the figures. Additional features and advantages are apparent from the subject matter described herein and the claims.

BRIEF DESCRIPTION OF THE DRAWINGS

Like reference numbers and designations in the various drawings indicate like elements.

DETAILED DESCRIPTION

In general, systems and techniques described herein enable users to change consent settings that define whether their data can be collected or maintained by other entities, what data is collected, and/or how their data is used by the entities. For example, some publishers of electronic resources, e.g., web pages, use cookies to collect user data and use that data to customize content of the resources. The techniques described in this document provide technical mechanisms that enable the user to define, in a secure way, whether such data can be collected, and if so, how that data is used. The entities can store the user data with user identifiers that uniquely identify the users to which the data belongs.

The user consent settings can be sent from a client device of the user in the form of an attestation token. The attestation token can include the consent settings and a digital signature of the consent settings and other data such that any modification to the user consent settings after creation can be detected. The signed data can include a unique identifier for the user so that recipients of the attestation token can verify that the attestation token was sent from a device of the user. The attestation token can also include an integrity token, e.g., a device integrity token and/or a browser integrity token, so that recipients can verify that the attestation token was received from a trusted device or trusted web browser or other application.

Figure 1:
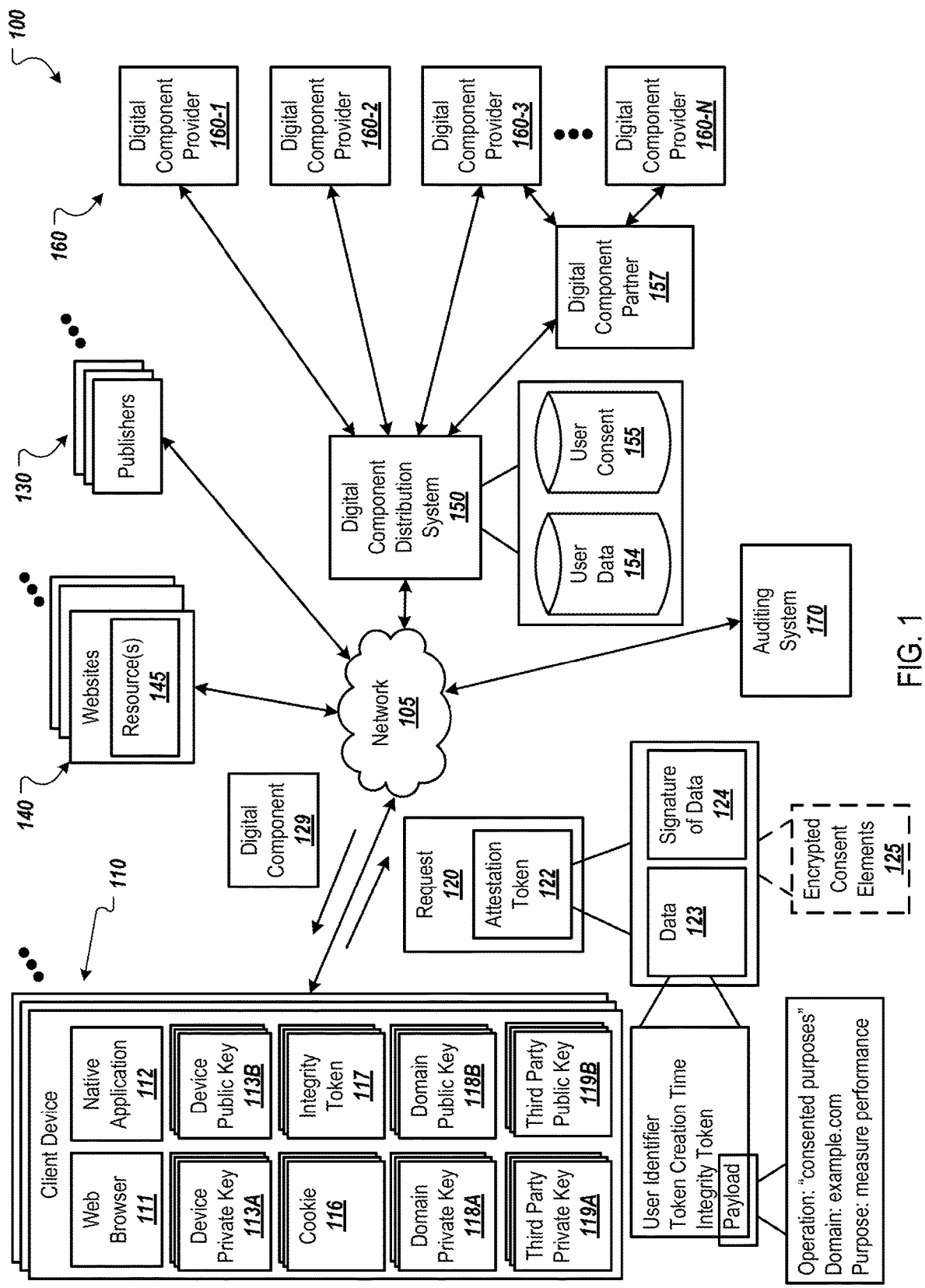
FIG. 1 is a block diagram of an environment in which a digital component system distributes digital components.

FIG. 1 is a block diagram of an environment 100 in which a digital component system 150 distributes digital components 129. The example environment 100 includes a data communication network 105, such as a local area network (LAN), a wide area network (WAN), the Internet, a mobile network, or a combination thereof. The network 105 connects client devices 110, publishers 130, websites 140, the digital component distribution system 150, and an auditing system 170. The example environment 100 may include many different client devices 110, publishers 130, and websites 140. In some implementations, the environment 100 can also include multiple digital component distribution systems 150 and/or auditing system 170.

A website 140 is one or more resources 145 associated with a domain name and hosted by one or more servers. An example website is a collection of web pages formatted in HTML that can contain text, images, multimedia content, and programming elements, such as scripts. Each website 140 is maintained by a publisher 130, which is an entity that controls, manages and/or owns the website 140.

A resource 145 is any data that can be provided over the network 105. A resource 145 is identified by a resource address, e.g., a Universal Resource Locator (URL), that is associated with the resource 145. Resources include HTML pages, word processing documents, and portable document format (PDF) documents, images, video, and feed sources, to name only a few. The resources can include content, such as words, phrases, images and sounds, that may include embedded information (such as meta-information in hyperlinks) and/or embedded instructions (such as scripts).

A client device 110 is an electronic device that is capable of communicating over the network 105. Example client devices 110 include personal computers, mobile communication devices, e.g., smart phones, and other devices that can send and receive data over the network 105. A client device can also include a digital assistant device that accepts audio input through a microphone and outputs audio output through speakers. The digital assistant can be placed into listen mode (e.g., ready to accept audio input) when the digital assistant detects a "hotword" or "hotphrase" that activates the microphone to accept audio input. The digital assistant device can also include a camera and/or display to capture images and visually present information. The digital assistant can be implemented in different forms of hardware devices including, a wearable device (e.g., watch or glasses), a smart phone, a speaker device, a tablet device, or another hardware device. A client device can also include a digital media device, e.g., a streaming device that plugs into a television or other display to stream videos to the television.

A client device 110 typically includes applications, such as a web browser 111 and/or native applications 112 to facilitate the sending and receiving of data over the network 105. A native application 112 is an application developed for a particular platform or a particular device. Publishers 130 can develop and provide the native applications to the client devices 110.

In some implementations, the client device 110 is a digital media device, e.g., a streaming device that plugs into a television or other display to stream videos to the television.

The digital media device can also include a web browser and/or other applications that stream video and/or present resources.

The web browser 111 can request a resource 145 from a web server that hosts a website 140 of a publisher 130, e.g., in response to the user of the client device 110 entering the resource address for the resource 145 in an address bar of the web browser 111 or selecting a link that references the resource address. When the web server (e.g., in a particular domain) provides a resource 145 to the web browser 111, the web server can also provide a cookie 116 of the publisher 130 that the web browser 111 stores on the client device 110. The cookie 116 is a small amount of data, e.g., a text file, that can be used for many purposes, including storing stateful information, recording browsing activity, and authenticating users. The cookies 116 can include a unique cookie identifier and the small amount of data (which can include a cookie value, attributes, etc.). This cookie is referred to as a first-party cookie as the cookie is created by a website that a user views directly, i.e., the website for which the domain is viewable in the address bar of the web browser 111.

The web browser 111 can send the publisher's first-party cookie to the web server that hosts the website 140 when the web browser 111 subsequently navigates to the resource 145 and/or while the resource 145 is presented by the web browser 111. The web server can use the data in the cookie 116, for example, to customize content for the user.

In some cases, another web server that hosts another website (e.g., in a different domain than the particular domain) also stores a cookie 116 on the client device 110 while the resource 145 is presented in the web browser 111, although that website's domain is not viewable in the address bar of the web browser 111 and the user did not navigate the web browser to that website. This cookie is referred to as a third-party cookie. A third-party cookie can be stored on the client device 110 when the resource 145 makes a call for content from the other web server.

Some resources 145, application pages, or other application content can include digital component slots for presenting digital components with the resources 145 or application pages. As used throughout this document, the phrase "digital component" refers to a discrete unit of digital content or digital information (e.g., a video clip, audio clip, multimedia clip, image, text, or another unit of content). A digital component 129 can electronically be stored in a physical memory device as a single file or in a collection of files, and digital components can take the form of video files, audio files, multimedia files, image files, or text files and include advertising information, such that an advertisement is a type of digital component. For example, the digital component 129 may be content that is intended to supplement content of a web page or other resource presented by the web browser 111 or native application 112. More specifically, the digital component 129 may include digital content that is relevant to the resource content (e.g., the digital component may relate to the same topic as the web page content, or to a related topic). The provision of digital components by the digital component distribution system 150 can thus supplement, and generally enhance, the web page or application content.

When the web browser 111 loads a resource 145 that includes one or more digital component slots, the web browser 111 can request a digital component 129 for each slot from the digital component distribution system 150. The digital component distribution system 150 can, in turn request digital components from digital component providers 160. The digital component providers 160 are entities that provide digital components for presentation with resources 145. Native applications 112 can request and present digital components 129 in a similar manner.

In some cases, the digital component distribution system 150 can also request digital components from one or more digital component partners 157. A digital component partner 157 is an entity that selects digital components 129 on behalf of digital component providers 160 in response to digital component requests.

The digital component distribution system 150 can select a digital component for each digital component slot based on various criteria. For example, the digital component distribution system 150 can select, from the digital components received from the digital component providers 160 and/or the digital component partners 157, a digital component based on relatedness to the resource 145, performance of the digital component (e.g., a rate at which users interact with the digital component), etc. The digital component distribution system 150 can then provide the selected digital component(s) to the client device 110 for presentation with the resource 145.

In some cases, the digital component distribution system 150, the digital component partner 157, and/or the digital component provider 160 for which a digital component is provided can also store a third-party cookie 116 on the client device 110. The web browser 111 can also provide the third-party cookie 116 to the entity that stored the third-party cookie on the client device 110. In this way, the entity can use information stored in the third-party cookie 116 to select digital components for presentation at the client device 110.

The web browser 111 and/or the native applications 112 can include tools that enable users to manage the data that is collected, stored, and used by other entities, such as publishers 130, the digital component distribution system 150, the digital component partner, and the digital component providers 160. For example, the web browser 111 and/or the native applications 112 can include a user interface, e.g., in the form of a menu, web page, or application page, that enables the users to manage their user data.

Managing user data can include configuring and/or adjusting user consent settings. The user consent settings can specify which entities can receive user data from the client device 110, whether and for how long the entities can store the user data, what types of user data the entities can obtain and store, and/or how the entities use the user data. The user data can include various data related to the user, such as resources requested by the user, browser history, digital components 129 presented to the user, digital components 129 with which the user interacted (e.g., selected), and/or other appropriate data collected using cookies. For digital media devices, the user data can include data specifying videos, movies, or shows viewed and/or recorded by the user, the favorite channels, movies, or shows of the user, sports teams viewed or followed by the user, resources requested using a web browser or other application of the device, and/or other appropriate data.

The user can specify different consent settings for different entities. For example, the user can specify that the digital component distribution system 150 (or the entity that operates the system) can collect and store user data and use the user data to select digital components for the user. The user can also specify that the digital component partner 157 (or another digital component distribution system) can collect and store the user data, but can only use the data to measure the performance of digital components provided to the user by the digital component partner 157 without using the user data to select digital components. The user can also specify that the digital component provider 160-1 is not allowed to collect or store user data of the user. These tools enable the users to manage their data and therefore their privacy across the online ecosystem. By implementing the functionality in a web browser 111 or native application 112, an improved user interface is provided in which a user can manage their data across the ecosystem from a single interface rather than providing various consent to each entity individually.

The client device 110 of a user can send requests 120 for various purposes. The client device 110 can send a request 120 to update user consent settings in response to the user changing the settings at the client device 110. The client device 110 can also send a request 120 for a digital component to the digital component distribution system 150, e.g., in response to the web browser 111 or native application 112 loading a resource that includes a digital component slot.

When the user modifies user consent settings, the web browser 111 or native application 112 that was used to update the user consent settings can generate the request 120 and send the request to one or more entities. These entities can include a set of entities in a registry. The registry can include entities that have agreed to follow a user consent and privacy data management policy. The entities can include publishers 130, digital component distribution systems 150 (e.g., ad tech companies), digital component partners 157, and/or digital component providers 160.

In another example, the one or more entities can include entities for which the user has allowed to collect and use the user data of the user. In another example, the one or more entities can include only the entities for which the settings were changed by the user. The web browser 111 or native application 112 can identify the recipient entities and send, to the recipient entities, a request 120 that includes data specifying the user consent settings, e.g., the modified user consent settings.

A request 120 can include an attestation token 122. For example, requests to change user consent settings and requests for digital components can include an attestation token 122. When the web browser 111 sends a request 120, the web browser 111 or an operating system of the client device 110 or another trusted program running on the client device 110) can generate the attestation token 122 for the request 120. When a native application 112 sends a request 120, the native application or the operating system can generate the attestation token 122. However, it may be more secure to use trusted code of the operating system or of the browser binary of the web browser to generate the attestation token 122 than using a native application 112.

The structure of and/or data included in an attestation token 122 for requests sent by a web browser 111 can differ from the structure of and/or data included in an attestation token 122 for requests sent by a native application 112. However, the attestation tokens 122 can have similar data, including a set of data 123 and a digital signature 124 of the set of data 123. In some implementations, the structure and data of the attestation token 122 are the same or similar for both web browsers 111 and native applications 112.

The set of data 123 can include, for both web browsers 111 and native applications 122, data specifying the purpose or operation of the request (e.g., to change user consent settings or request a digital component), a user identifier that uniquely identifies the user (e.g., a public key), an attestation token creation time that indicates a time at which the attestation token 122 was created, an integrity token (e.g., a device integrity token and/or a browser integrity token), and a digital signature 124 of at least a portion of the other data of the attestation token 122.

For a native application 112, the set of data 123 in the attestation token 122 can include the user identifier, the attestation token creation time, a payload, and a device integrity token. The user identifier can be a public key of the client device 110. For example, the client device 110 can generate and/or maintain one or more pairs of cryptographic keys including a device private key 113A and a device public key 113B that corresponds to, and is mathematically linked to, the device private key 113A. Data that is digitally signed using a private key can only be verified using the corresponding public key. Similarly, data that is encrypted using the public key can only be decrypted using the corresponding private key.

The native application 112 can generate the digital signature 124 of the set of data 123 (or of a pre-processing, e.g., a hash, of the data 123) using the device private key 113A that corresponds to the device public key 113B that serves as the user identifier. In some implementations, the native application 112 uses an Elliptic Curve Digital Signature Algorithm (ECDSA) to generate the digital signature 124, but other digital signature techniques can be used, such as RSA. As the attestation token 122 can be sent from mobile devices and many attestation tokens may be stored by an entity, signature techniques that result in signatures with smaller data sizes (e.g., ECDSA) may be preferable for reducing bandwidth consumption and data storage requirements. By including the device public key 113B in the attestation token 122, the entities that receive the attestation token 122 can verify the digital signature 124.

The device private key 113A and the device public key 113B of the client device 110 can be replaced. For example, the keys 113A and 113B can be replaced periodically based on a specified time period to prevent entities from tracking users using the device public key 113B included in the attestation tokens 122. In another example, the user can initiate the key replacement and, in response, a new pair of private and public keys can be generated by the client device 110.

The device private key 113A can be maintained securely and confidentially by the operating system (or other trusted program) of the client device 110. The use of the digital signature 124 using the device private key 113A in this manner prevents other entities from forging the payload of the attestation token 122 or generating falsified requests 120 to seem like they originate from the client device 110 as any change to the signed data can result in a completely different digital signature.

The payload in the set of data 123 can include data related to the request 120. For example, the payload can include the purpose or operation of the request (e.g., to change user consent settings or request a digital component). For requests to change user consent settings, the payload can include data identifying the entities affected by the settings, e.g., the domains affected by the settings, and the user consent settings for each entity. For example, the payload can include a domain name for an entity and the consent to use the user's data granted to that domain by the user (e.g., measure digital component performance, select personalized digital components).

The payload can also include an expiration time (e.g., a date and time or a time duration) for the user consent settings. Each entity can have the same or a different expiration time. The user consent settings expire when the expiration time lapses. In some implementations, if an entity does not receive updated user consent data prior to the expiration time, the entity is required to delete the user's data or at least stop using the user's data. In some implementations, the native application 112 can periodically send the requests 120 with user consent settings if the user consent settings have not been modified and the user has specified that the user consent settings should not expire until modified. In this way, the user data may not be deleted unless the user has taken action to delete the user data. In some implementations, the native application 112 may require that the user actively agree to continue with the user consent settings, e.g., by prompting the user when the user consent settings are close to expiring.

The native application 112 can send a different attestation token 122 to each entity. For example, when the user modifies user consent settings, the native application 112 can send a different attestation token 122 to each entity for which the user consent settings have been modified by the user in cases in which the user changes the settings for multiple entities. This keeps the user consent settings for each entity confidential and prevents entities from aggregating information for other entities.

For requests for digital components, the payload can include data that can be used to select a digital component. This payload could include the native application 112 that is sending the request 120, information about the native application 112 (e.g., topic of the application 112), information about the digital component slot (e.g., the number of slots, the type of slots, the size of the slots, etc.), information about the client device 110 (e.g., type of device, IP address of the device, geographic location of the client device 110) if the user has enabled this feature, and/or other appropriate information.

As described above, the token creation time indicates a time at which the attestation token 122 was created. The native application 112 or operating system that creates the attestation token 122 can record the creation time when the attestation token 122 is created. This token creation time can be a high resolution timestamp (e.g., accurate to the second, to the millisecond, or to the microsecond). The token creation time can be used to determine whether a request 120 that includes the attestation token 122 is new or recent request. For example, the entity that receives the attestation token 122 can compare the token creation time to a current time or a time at which the attestation token 122 was received. If the difference between the two times exceeds a threshold, the entity can determine that the request is not new, or invalid.

The token creation time can also be used to detect replay attacks. For example, if multiple requests having the same set of data 123, including the same token creation time, are received, the entity that receives the requests can determine that the requests are duplicates and/or that the requests are part of a replay attack.

In another example, a combination of the token creation time with the user identifier (e.g., public key) can be used to detect duplicate requests or replay attacks. This combination can act as a unique identifier for the request and the attestation token of the request. For example, if two requests include the same user identifier and have token creation times that match, the requests may be duplicates and/or part of a replay attack.

The set of data 123 can also include an integrity token to enhance the fraud detection capabilities of the attestation token 122. The integrity token can be a device integrity token that enables an entity to determine whether a request 120 was sent by a trusted client device 110. For example, the device integrity token can be issued by a third-party device integrity system that evaluates fraud signals of client devices and assigns a level of trustworthiness to the client devices based on the evaluation.

The device integrity token for a client device 110 can include a verdict that indicates the level of trustworthiness (or integrity) of the client device 110 at the time that the device integrity token was generated, a device integrity token creation time that indicates a time at which the device integrity token was generated, and a unique identifier for the client device 110 (e.g., the device public key 113B of the client device or its derivative). The device integrity token can also include a digital signature of the data in the device integrity token using a private key of the device integrity system. For example, the device integrity system can sign the data using its private key, which the system maintains confidentially. The entities that receive the attestation token 122 can use a public key of the device integrity system to verify the signature of the device integrity token. As the integrity of a client device 110 can change over time, each client device 110 can request a new device integrity token periodically.

The digital signature 124 of the attestation token 122 can be a digital signature of the set of data 123 (or a pre-processing of the data 123) using the device private key 113A. For example, the digital signature 124 can be a digital signature of the payload, the user identifier (e.g., device public key 113B), the attestation token creation time, and the integrity token. In this way, the entities that receive the request 120 can verify that none of this data has changed or been forged by verifying the digital signature 124 using the public key 113B.

For a web browser 111, the attestation token 122 can include similar data and a similar structure as the attestation token 122 for the native application 112. For example, the attestation token 122 can include a set of data 123 that includes a user identifier, an attestation token creation time, an integrity token, and a payload. The attestation token 122 can also include a digital signature 124 of the set of data 123.

The integrity token can be the same device integrity token described above for attestation tokens 122 included in requests from native applications. In another example, the integrity token can be a browser integrity token that indicates the integrity of the web browser 111, or whether the user's interactions with websites are genuine. Examples of non-genuine user interactions include interactions initiated by bots, etc. rather than the user. A browser integrity token can be issued by a third-party browser integrity system based on fraud detection signals sent to the third browser integrity system. The fraud signals can include, for example, mouse movement speed, direction, intermission and other patterns, click patterns, etc.

Similar to the device integrity token, the browser integrity token for a web browser 111 can include a verdict that indicates the level of trustworthiness (or integrity) of the web browser 111, or the level of genuineness of user interactions with websites, at the time that the browser integrity token was generated, a browser integrity creation time that indicates a time at which the browser integrity token was generated, and a unique identifier for the client device 110 (e.g., the public key 113B of the client device or web browser or its derivative). The browser integrity token can also include a digital signature of the data in the browser integrity token using a private key of the browser integrity system. For example, the browser integrity system can digitally sign the data using its private key, which the system maintains confidentially. The entities that receive the attestation token 122 can use a public key of the browser integrity system to verify the signature of the browser integrity token. The client device 110 can store integrity tokens 117 (e.g., a device integrity token and/or a browser integrity token) for inclusion in attestation tokens 122.

The public key used as the user identifier in attestation tokens 122 sent by the web browser 111 can vary in different implementations. In some implementations, the user identifier is the device public key 113B similar to the user identifier in attestation tokens for native applications 112.

In some implementations, the user can be associated with multiple user identifiers that have limited scope. For example, the web browser 111 can generate, for each first-party domain, a domain private key 118A and a domain public key 118B that corresponds to, e.g., that is mathematically linked to, the domain private key 118A. For example, the web browser 111 can generate a public/private key pair for each domain that the web browser 111 navigates to on the client device 110. This domain public key 118B for a particular domain can serve as the user identifier for the user for requests 120 sent in response to the web browser 111 navigating to the particular domain.

In this way, for a particular domain, the domain public key 118B will be the user identifier in the third-party context. As the user identifier seen by the third parties will be different for each first-party domain, the scope of the user data for that user identifier will be limited to the data for that first-party domain. Thus, the third parties will not be able to aggregate the user data across all first-party domains. Instead, the third parties will treat each user identifier as a unique user. By using a public key for each domain as the user identifier for that domain, the user consent can be verified at the domain level.

In another example, the web browser 111 can also generate, for each third-party that has a third-party cookie on the client device 110, a third-party private key 119A and a corresponding third-party public key 119B. For example, the web browser 111 can generate a public/private key pair for each third-party domain that stores a cookie on the client device 110 while the web browser 111 was presenting a resource of a first party domain. In this example, the user identifier in the attestation token 122 sent to a third-party entity is the third-party public key for the third-party entity.

In examples in which a user is associated with multiple user identifiers, e.g., multiple domain public keys 118B for multiple first-party domains or multiple third-party public keys 119B for multiple third-party entities, the web browser 111 can send a respective request 120 to update the user consent settings for each user identifier. For example, the web browser 111 can send a first request that includes, as the user identifier, the domain public key for a first domain, a second request that includes, as the user identifier, the domain public key for a second domain, and so on for each first-party domain for which the web browser 111 created a public/private pair. The web browser 111 can do this each time the user updates the user consent settings for the various entities.

In some implementations, the user identifier is a cryptographic hash of a public key. When the public key is sent as the payload, the public key can be checked against the identity of a user using the hashing operation used to generate the hash of the public key. In some implementations, the an entity that receives attestation tokens 122 from client devices 110 can explicitly link the identity of the user with the user data for the user so that the entity can recognize a new request from a user and associate the request (and its data) with the user's identity. In this context, attestation can be associated with signing a request with a public key which is part of the user identify in the given setting (e.g., as the given device, browser, etc.)

The same request 120, or at least the same attestation token 122, can be sent to multiple entities from the web browser 111. Such requests can include the same payload in the set of data 123, e.g., general data related to the request 120. Examples of payload data include, but are not limited to, the intention or intended operation of the attestation token, e.g. update user consent, request digital component 129, additional parameters relevant to the intention or intended operation, e.g. the domain to which the updated user consent applies, the size of the slot in which digital component 129 will be rendered, and/or a billing/account ID that uniquely identifies the publisher 130 that owns the website 140.

However, some of the data of the request 120 or attestation token 122 can be specific to each entity to which the request 120 is being sent, e.g., each entity in the registry or each entity for which user consent settings are being modified. As this data may be confidential for each entity, the attestation token 122 can include an encrypted consent element 125 for each entity to which the request is being sent.

An encrypted consent element 125 for an entity includes the data that is specific to that entity. This data can include a similar payload as the payload for requests sent from the native applications 112. For example, the payload can include the purpose or operation of the request (e.g., to change user consent settings or request a digital component). For requests to change user consent settings, the payload of an encrypted consent element 125 for an entity can include the user consent settings that the user specified for that entity. The payload can also include an expiration time (e.g., a date and time or time duration) for the user consent settings, similar to the expiration time described above.

For requests for digital components, the payload of the encrypted consent element 125 for an entity can include data that can be used to select a digital component. This data can vary for different entities as the user may have consented to different types of data, or to whether data can be sent at all, to the different entities. For example, this payload data could include the resource 145 that has the digital component slot (or a URL for the resource 145), information about the resource 145 (e.g., topic of the resource), information about the digital component slot (e.g., the number of slots, the type of slots, the size of the slots, the restriction of the slots, e.g., only support digital components of a video type, etc.), information about the client device 110 (e.g., type of device, IP address of the device, geographic location of the client device 110) if the user has enabled this feature, and/or other appropriate information. The payload of the encrypted consent element 125 for an entity can also include a third-party cookie of the entity that is stored at the client device 110.

The payload of the encrypted consent element 125 for each third-party entity can also include the user identifier for the user, e.g., a public key. The user identifier in each encrypted consent element 125 can be the same as the user identifier in the set of data 123 of the attestation token 122. For example, depending on the implementation, this user identifier can be the device public key 113B, the domain public key 118B for the first-party domain for which the web browser 111 is presenting a resource, or a third-party public key 119B for the third-party for which the attestation token 122 is generated. This inclusion of the user identifier in each encrypted consent element 125 binds the encrypted consent elements to the user identifier and to the attestation token 122.

In implementations in which the user identifier of the encrypted consent elements matches the user identifier of the attestation token 122 and a public key is used as the user identifier, the user identifier in each encrypted consent element 125 can be the public key itself or a derivative of the public key. For example, the user identifier of each encrypted consent element 125 can be a hash of the public key generated using a cryptographic hash function, e.g., SHA256. Using a hash of the public key can reduce the data size of the user identifier relative to using the public key itself (e.g., from 33 bytes for ECDSA using NIST P-256 to 512 bytes for RSA-4096 to 16 bytes for SHA 256 followed by a truncation operation), which can reduce consumed bandwidth and battery life for mobile devices in sending requests 120, and memory required to store attestation tokens 122. As some entities may store attestation tokens 122 for many, e.g., thousands or millions, of users, this can result in substantial data storage savings.

The encrypted consent element 125 can also include a digital signature of the other data of the encrypted consent element 125. For example, the encrypted consent element 125 can include a digital signature of the user identifier, the payload, and the third-party cookie of the entity if the cookie is included in the encrypted consent element 125. The web browser can generate the digital signature for the encrypted consent element 125 for a third-party entity using the private key that corresponds to the public key used as the user identifier.

The web browser 111 can generate the encrypted consent element 125 for each entity by encrypting the data and digital signature for each entity. For a particular entity, the web browser 125 can generate a consent element that includes the user identifier, the payload for the entity, and optionally the third-party cookie for the entity. The web browser 125 can generate the digital signature of this data using the private key that corresponds to the public key used as the user identifier. The web browser 111 can then encrypt the consent element for the entity using a public key created and published by the entity. The web browser 111 can retrieve, from each third-party entity's website, the third-party public key for that entity after the entity generates the public/private key pair. The entity can maintain the private key confidentially so that the entity is the only one that can decrypt its encrypted consent element 125. In some implementations, this encryption uses the digital signature 124 of the other data of the set of data 123 of the attestation token 122 as the encryption Initialization Vector (IV).

The attestation token 122 sent by the web browser 111 when presenting a resource of a particular domain can include the set of data 123 that includes the user identifier (e.g., the domain public key), the attestation token creation time, the payload, and the integrity token. The attestation token 122 also includes a digital signature 124 of the set of data 123 that is generated using the domain private key 118A that corresponds to the domain public key 118B for the particular domain. The attestation token 122 can also include, for each third-party entity that has a third-party cookie at the client device 110 or a portion thereof, an encrypted consent element for that third-party entity.

In some implementations, attestation tokens 122 sent by native applications 112 can include encrypted consent elements 125, similar to the attestation tokens 122 sent by the web browser 111. In some implementations, the web browser 111 can send requests 120 without encrypted consent elements 125. For example, if user consent data is only updated for one entity, the web browser 111 can send the user consent data for that one entity in the payload or otherwise in unencrypted form. In some implementations, the encrypted consent elements 125 are included in attestation tokens 122 when the attestation token 125 is being sent to multiple entities, e.g., either by the web browser 111 or the native application 112.

The client device 110 can send the requests 120 generated by the web browser 111 and the native applications 112 to one or more recipient entities. The native applications 112 can send a respective request 120 to each entity as the payload of the attestation tokens 122 generated for the native applications can be specific to each entity, as described above. Each entity can verify the integrity of the request 120 by verifying the digital signature 124 using the device public key 113B in the attestation token 122. This verification can also include verifying the integrity of the client device 110 using the device integrity token.

The web browser 111 can send the request to multiple entities or to the digital component distribution system 150, which can send corresponding requests to other entities such as the digital component partner 157 and the digital component providers 160. These entities can verify the integrity of the requests by verifying the digital signature 124 and verifying the integrity of the client device 110 and/or the web browser 111 using the integrity token(s). Each entity can also decrypt its encrypted consent element 125 using its confidential private key to access the payload sent to that entity.

In either case, if the request 120 is verified, the entity can perform an action in response to the request. If the request is to change the user consent settings for the user with respect to the entity, the entity can comply with the request. For example, if the user changed the settings such that the entity cannot collect the user's data, the entity can comply by deleting the user's data. If the user changed the settings to only use the user's data to perform one or more particular actions, the entity can only use the user's data for those actions after receiving the request 120.

If the request 120 is for a digital component, the entity can select one or more digital components based on the payload and in accordance with the user's consent settings for that entity. For example, if the user has consented to the entity using the user's data for selecting a digital component, the entity can select a digital component using the user's data to which the entity has access, e.g., in combination with the data in the payload and/or the request 120. If the user has not consented to the entity using the user's data for selecting a digital component, the entity can select a digital component based on the data in the payload and/or the request 120 that is not specific to the user.

In some implementations, the user consent settings are sent with each request 120, even if the request is for a digital component 129. In this way, the entities can verify the current user consent settings and store the user consent settings with the request so that the entity can verify the user consent settings, if necessary. By including the user identifier, the user data (e.g., a cookie with the user's data), and the user consent settings together in a digitally signed request, the integrity of the user consent settings for that entity and that request can be technically verified.

Each entity can store user consent settings received from users. The entities can also store the user data to which the users have consented. For example, the digital component distribution system 150 includes a user data storage unit 154 for storing user data and a user consent data storage unit 155 for storing the user consent settings for the user. The digital component partner 157, the digital component providers 160, and/or other entities can include similar data storage units.

The entities can store the user consent settings in a manner that is technically verifiable. For example, the entities can store, for each user, the attestation tokens 122 that include the user consent settings for the user. As the attestation tokens 122 include digital signatures of the user identifier, the user consent settings, and an expiration date for the user consent settings, the user consent settings for each point in time can be verified. The digital signature of this data ensures that the data cannot be modified by the entity or another party.

The auditing system 170 can audit entities to ensure that the entities are storing and using the user data of the users in accordance with the user consent settings. The auditing system 170 can be maintained by an independent third-party, such as an industry or regulatory body. The auditing system 170 can check the digital signatures of the attestation tokens 122 for each user record maintained by an entity. The audit system 170 can also compare the user data of each record against the user consent to ensure that the entity has been given proper consent to store such data. Such auditing can occur periodically or randomly.

As described above, a web browser 111 or native application 112 can send attestation tokens 122 with user consent settings periodically to ensure that the previous user consent settings do not expire. In some implementations, the web browser 111 or native application 112 can require a confirmation response from the entity in response to receiving the attestation token 122 each time the entity receives an attestation token 122 from the client device 110, including in non-periodic requests for digital components. The confirmation can be stored at the client device 110 and/or sent to the auditing system 170. In this way, the auditing system 170 can verify that the entity received the user consent settings and prevent entities from fraudulently deleting user consent settings. For example, if the entity confirms that it received a request to delete the user's data then the entity deletes the request while maintaining the user's data, the confirmation can be used to show that the entity did receive the request but failed to comply with the request. If the confirmation is not received, the web browser 111 or native application 112 an issue an alert, e.g., to the auditing system 170.

In some implementations, some requests 120 can be sent without user consent settings, e.g., without an attestation token 122. For example, the web browser 111 or native application 112 can send a digital component request that includes the user identifier (e.g., a public key) and the payload for the digital component request. The entities that receive the request can use the user identifier to store the data with the appropriate user. The attestation token(s) received from the client device 110 in previous requests can be used to verify the user consent settings at the time of the requests that do not have user consent settings.

In some implementations, the auditing system 170 can evaluate user data stored by each entity (e.g., the digital component distribution system 150, each digital component partner 157, each digital component provider 160, and/or each publisher 130) that receives user data to ensure that the entities are storing and/or using the user data in accordance with each user's user consent settings. This evaluation also includes verifying the signatures of the attestation tokens and/or the encrypted consent elements that include the user consent settings. As the public keys that are used to verify the digital signatures are included in the attestation tokens, the auditing system 170 can access the public keys and use the public keys to verify the signatures of the attestation tokens and the encrypted consent elements. If a digital signature cannot be verified, then the content of the attestation token or the encrypted consent element has been modified, e.g., fraudulently.

Figure 2:
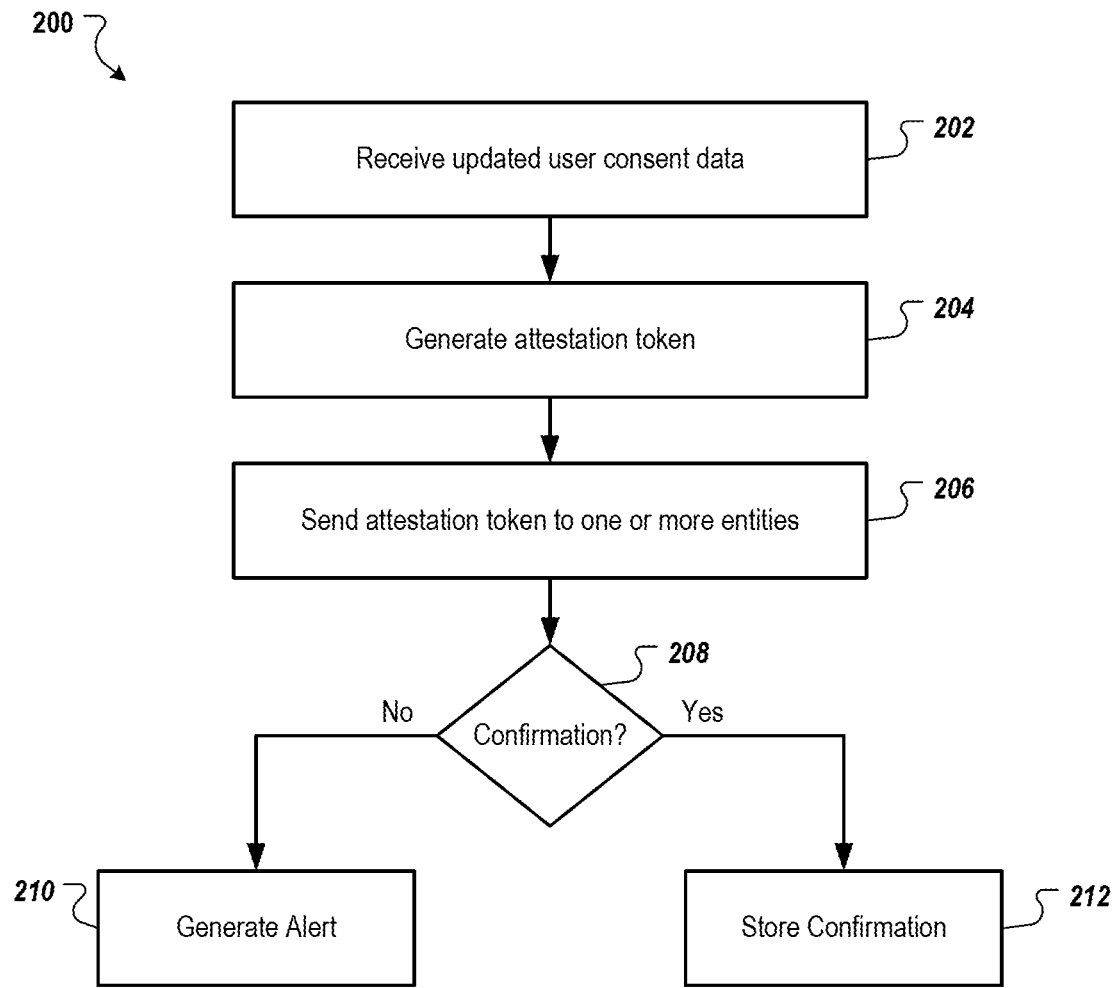
FIG. 2 is a flow diagram that illustrates an example process for updating user consent settings.

FIG. 2 is a flow diagram that illustrates an example process 200 for updating user consent settings. The process 200 can be implemented, for example, by a recipient of a request to update a user's user consent settings, such as a publisher 130, a digital component distribution system 150, a digital component partner 157, or a digital component provider 160 of FIG. 1. Operations of the process 200 can also be implemented as instructions stored on non-transitory computer readable media, and execution of the instructions by one or more data processing apparatus can cause the one or more data processing apparatus to perform the operations of the process 200.

Updated user consent data is received (202). The updated user consent data can be received by a web browser or native application running on a client device. For example, the web browser or native application can present a user interface that enables the user to configure, e.g., select or input, user consent settings for one or more entities. The updated user consent data can include updated user consent settings that define whether the user's data can be collected or maintained by other entities, what data is collected, and/or how their data is used by the entities. As described above, the user consent settings can be included in an attestation token.

An attestation token is generated (204). As described above, a web browser, operating system, or other trusted program of a client device can generate an attestation token. The attestation token can include a set of data that includes the updated user consent data. The set of data can also include a user identifier (e.g., a public key), an attestation token creation time, a payload, an integrity token (e.g., a device integrity token). The attestation token can also include a digital signature of the set of data. The digital signature of the set of data can be generated using a private key that corresponds to the public key that serves as the user identifier.

For situations in which the user consent data is updated using a native application, a respective attestation token can be generated for each entity that will receive updated user consent data. The user consent data for each entity can be included in the payload of the attestation token generated for that entity.

For situations in which the user consent data is updated using a web browser, the attestation token can include an encrypted consent element for each entity. As described above, the encrypted consent element for an entity can include the user consent data for that entity and can be encrypted using a public key obtained, e.g., fetched, from the entity. In this way, the same attestation token can be sent to multiple entities, but each entity can only decrypt the encrypted consent element for that entity as that entity is the only entity with the private key that can decrypt its encrypted consent element. This ensures that no other entity can access the user consent settings for other entities and that entities cannot track other entities.

The attestation token(s) are sent to one or more entities (206). For example, if the user updated the user consent data using a native application, the native application can send a respective attestation token to each entity for which an attestation token was generated. If the user updated the user consent data using a web browser, the web browser can send the same attestation token with multiple encrypted consent elements to multiple entities.

A determination is made, for each entity, whether confirmation is received from the entity (208). For example, each entity can be required to confirm receipt of updated user consent data for each user. The web browser or native application that sends the attestation token to an entity can monitor for confirmation from that entity. If the confirmation is not received within a specified time duration, the web browser or native application can request confirmation one or more times.

If confirmation is not received from an entity, an alert can be generated (210). For example, the web browser or native application that sent the attestation token can generate and send an alert to an auditing system in response to determining that confirmation was not received from an entity, e.g., after a specified time duration. The alert can specify the entity that did not confirm receipt of the attestation token. In some implementations, the alert can include the attestation token sent to the entity. An auditor that maintains the auditing system can follow up with the entity in response to the alert, e.g., to confirm that the entity is in compliance with the updated user consent settings.

If confirmation is received, the confirmation is stored (212). The confirmation can be stored at the client device and/or sent to an auditing system for storage. In this way, the confirmation can be used to audit the entity from which the confirmation was received, if appropriate.

Figure 3:
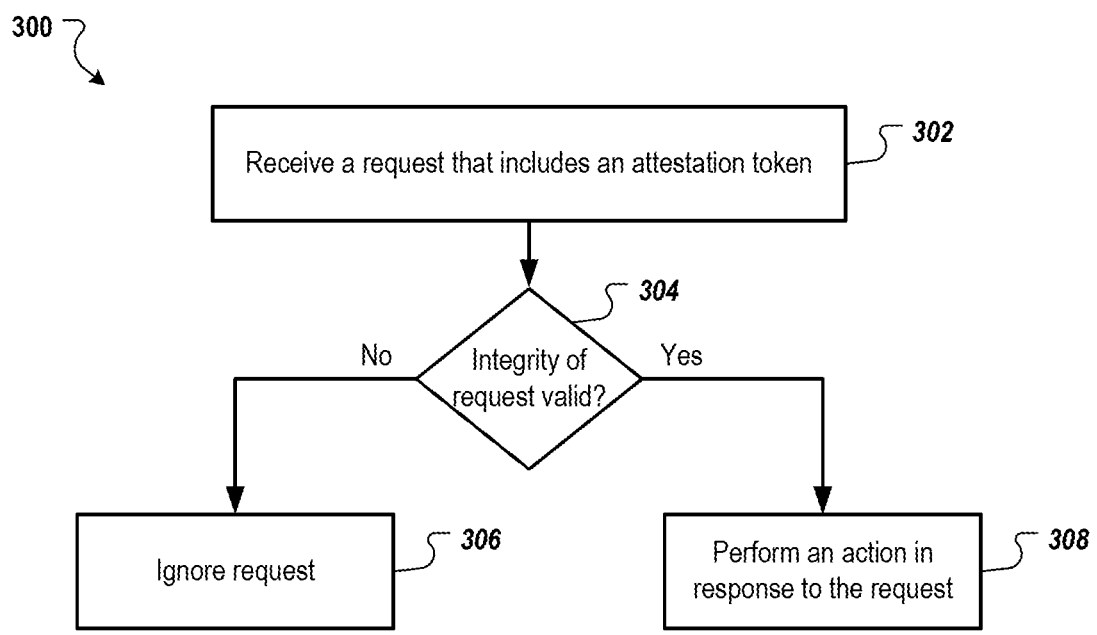
FIG. 3 is a flow diagram that illustrates an example process for validating the integrity of a request and performing an action in response to the request.

FIG. 3 is a flow diagram that illustrates an example process 300 for validating the integrity of a request and performing an action in response to the request. The process 300 can be implemented, for example, by a recipient of the request, such as a publisher 130, a digital component distribution system 150, a digital component partner 157, or a digital component provider 160 of FIG. 1. Operations of the process 300 can also be implemented as instructions stored on non-transitory computer readable media, and execution of the instructions by one or more data processing apparatus can cause the one or more data processing apparatus to perform the operations of the process 300.

A request is received (302). The request can include an attestation token. As described above, the attestation token can include a payload that specifies an operation of the request. In another example, the request can specify the operation of the request and include the attestation token for verification and/or security purposes.

Figure 4:
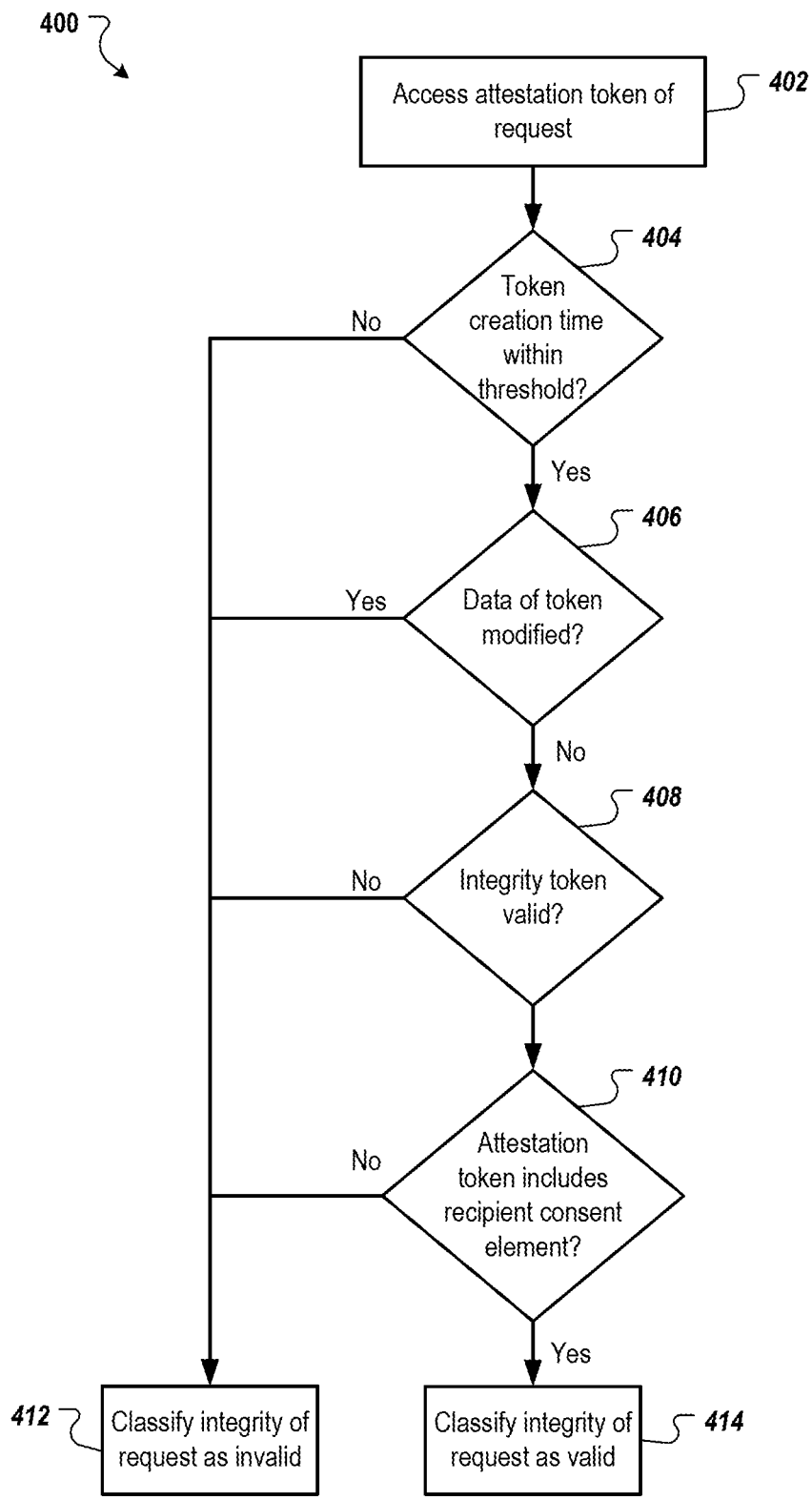
FIG. 4 is a flow diagram that illustrates an example process for determining whether the integrity of a request is valid using an attestation token.
Figure 5:
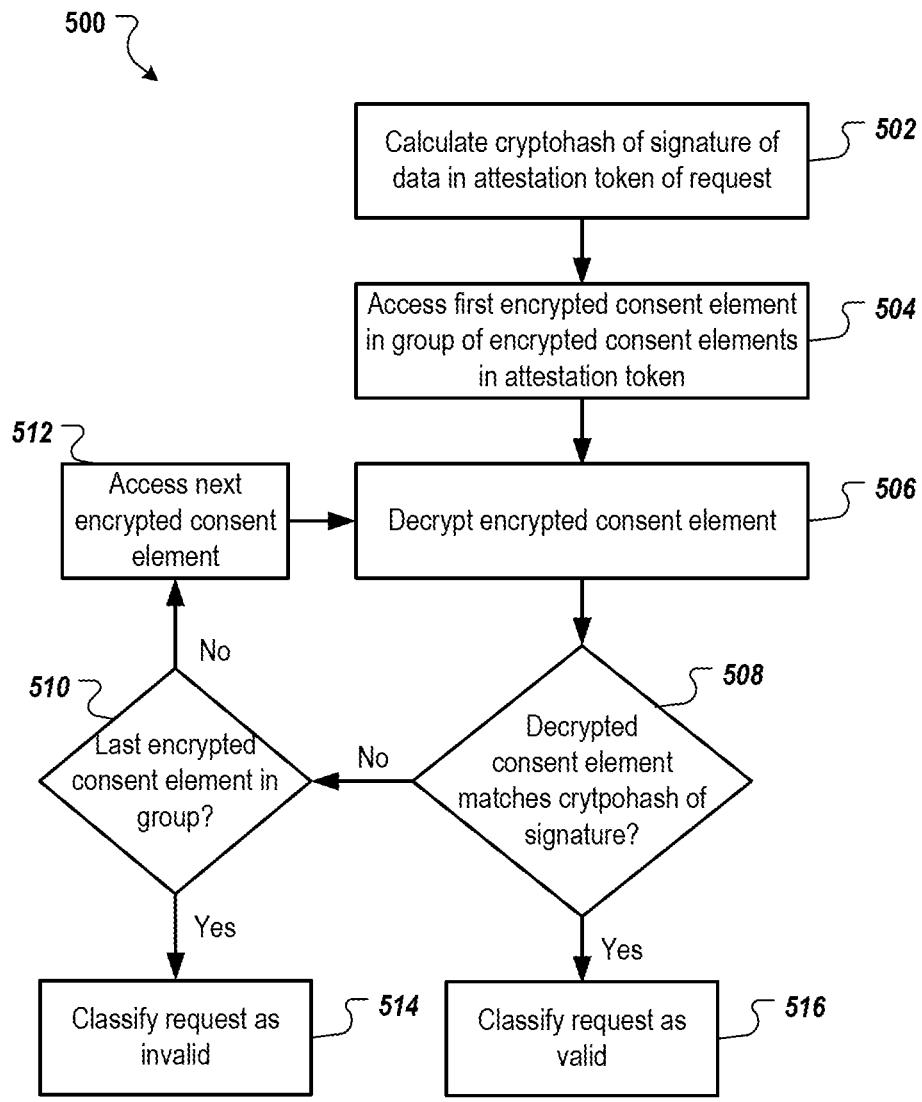
FIG. 5 is a flow diagram that illustrates another example process for determining whether the integrity of a request is valid using an attestation token.
Figure 6:
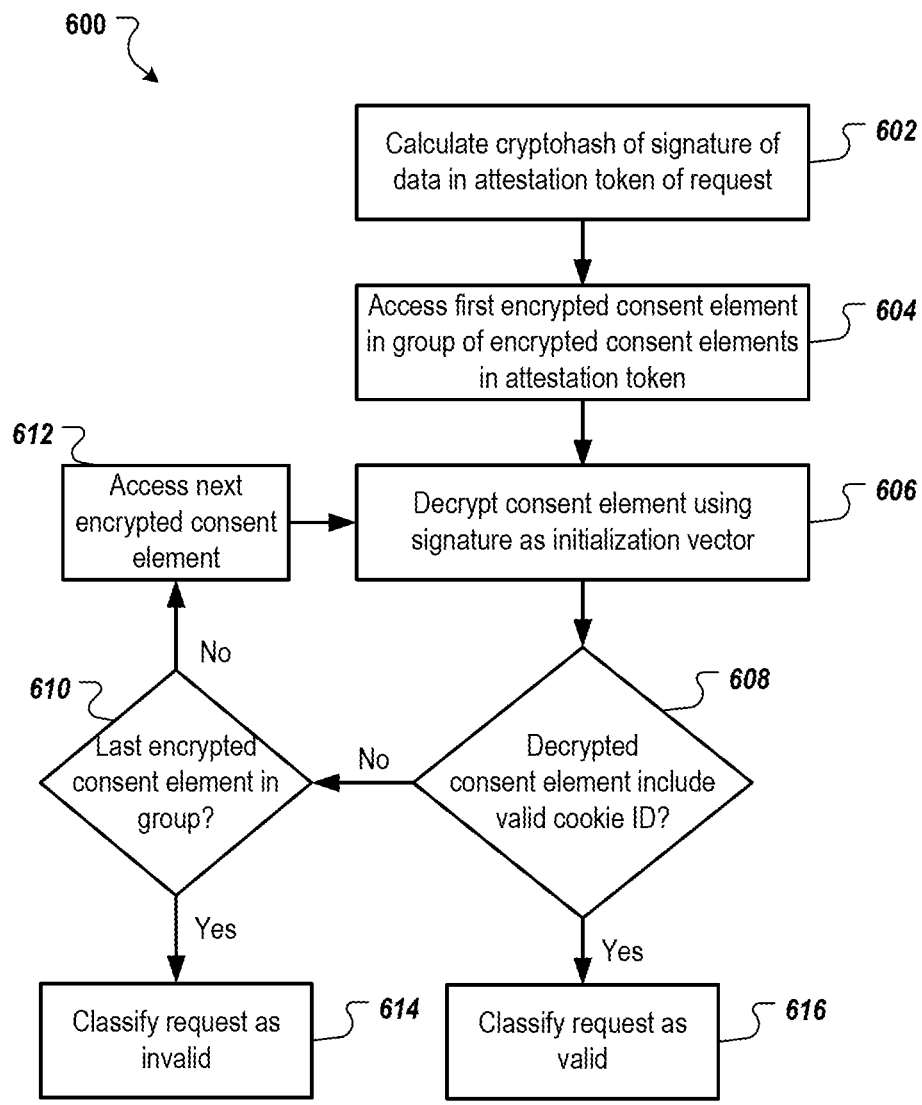
FIG. 6 is a flow diagram that illustrates another example process for determining whether the integrity of a request is valid using an attestation token.

A determination is made whether the integrity of the request is valid (304). The integrity of the request can be invalid if any data in the set of data changed between the time at which the attestation token was created, a duration of time between the token creation time and the time at which the request was received exceeds a threshold, the integrity token is invalid, or the attestation token does not include an encrypted consent element of the recipient. Example processes for determining whether the integrity of a request is valid are illustrated in FIGS. 4-6 and described below.

If the integrity of the request is not valid, the request is ignored (306). For example, the entity that receives the request can delete the request and/or not respond to the request. The entity can also send a response to the client device that specifies that the request was not valid. In this way, the client device can retry the request as the previous request may have been fraudulently tampered with during transmission to the entity.

If the request is to update user consent settings, the entity that receives the request can determine to not change the user consent settings for the user identifier included in the attestation token in response to determining that the request is invalid. If the request is for a digital component, the entity may not provide a digital component in response to the request.

If the integrity of the request is valid, an action is performed in response to the request (308). The computer system can extract the operation to be performed from the attestation token to determine the operation to perform. For example, the computer system can extract the operation from the payload of the attestation token. In another example, the computer system can decrypt the encrypted consent element for the entity using the private key of the entity, as described below with reference to FIGS. 5 and 6. The computer system can then extract the operation from the decrypted consent element.

If the operation specified by the request is to update user consent settings for the user identifier included in the attestation token, the entity can update the user consent settings for the user identifier. In a particular example, if the updated user consent settings indicate that the user's data is to be deleted, the entity can delete the user's data in order to comply with the updated user consent settings. For user consent setting updates, the entity can also store the attestation token for verification purposes, as described above.

If the operation specified by the request is requesting a digital component, the entity can select a digital component, e.g., based on information included in the request or the payload and/or stored user data to the extent the user's consent settings allow. The entity can then provide the digital component to the client device for presentation to the user.

FIG. 4 is a flow diagram that illustrates an example process 400 for determining whether the integrity of a request is valid using an attestation token. The process 400 can be implemented, for example, by a recipient of the request, such as a publisher 130, a digital component distribution system 150, a digital component partner 157, or a digital component provider 160 of FIG. 1. Operations of the process 400 can also be implemented as instructions stored on non-transitory computer readable media, and execution of the instructions by one or more data processing apparatus can cause the one or more data processing apparatus to perform the operations of the process 400.

An attestation token is accessed (402). The attestation token can be included with a request received from a web browser or native application. In another example, the attestation token can serve as the request. As described above, the attestation token includes a set of data, a digital signature of the set of data, and optionally one or more encrypted consent elements. The set of data can include a payload (e.g., an operation and data related to the operation), an attestation token creation time that indicates a time at which the attestation token was created, and an integrity token, e.g., a device integrity token.

The set of data can also include a user identifier for the user. The user identifier can be in the form of a public key. For example, the user identifier can be a device public key of the client device, a domain public key generated for the first-party domain of the resource for which the request is sent (e.g., in response to the web browser navigating to the first-party domain and loading a resource from the first-party domain), or a third-party public key for the recipient of the request.

A determination is made whether the token creation time is within a threshold time duration of a time at which the request was received or within a threshold time duration of a current time (404). For example, a determination can be made of the difference between the time at which the request was received (or the current time) and the token creation time. If the difference is less than or equal to the threshold time duration, the token creation time is within the threshold time duration. If the token creation time is not within the threshold time duration, e.g., meaning that the request is old, the integrity of the request can be classified at invalid (412).

In addition, the combination of token creation time and the public key in the attestation token may uniquely identify the attestation token and request carrying the token. The recipient can rely on the combination to recognize duplicate request or potential replay attack.

If the token creation time is within the threshold time duration, e.g., meaning that the request is new or recent, a determination is made whether data in the set of data of the attestation token has been modified after the digital signature of the attestation token was generated (406). For example, the public key of the attestation token can be used to verify the digital signature of the attestation token. If the signature cannot be verified using the public key, a determination is made than the data in the set of data has been modified. For example, such data may have been modified by an entity that intercepted the request or an intermediary. If the digital signature is verified using the public key, a determination is made that the data in the set of data of the attestation token has not been modified.

If a determination is made that the data in the set of data has been modified, the integrity of the request is classified as being invalid (412). If a determination is made that the data in the set of data of the attestation token has not been modified, a determination is made whether the integrity token is valid (408). The integrity token can be a device integrity token. This determination can include determining whether the verdict of the device integrity token indicates that the client device is valid. If the verdict is invalid, a determination is made that the device integrity token is invalid and the integrity of the request is classified as invalid. If the verdict is valid, a determination can be made that the device integrity token in valid.

This determination can also include verifying the digital signature of the device integrity token. As described above, the device integrity system can digitally sign the data of the device integrity token using a private key of the device integrity system. The device integrity system can provide a public key that corresponds to this private key to recipients that may receive device integrity tokens generated by the device integrity system. Each recipient of the request can use this public key to verify the signature of the device integrity token which, if successful, indicates that the data of the device integrity token has not been modified since it was created. In this example, if the verdict is valid and the digital signature of the device integrity token is verified successfully, a determination can be made that the device integrity token in valid.

For attestation tokens that do not include encrypted consent elements or even user consent settings, the request would be considered valid if it has been determined that the attestation token creation time is within the threshold, the data of the attestation token has not been modified, and the integrity token is valid. For attestation tokens that include encrypted consent elements, optional operation 410 can be used to ensure that the request is valid.

In operation 410, a determination is made whether the attestation token includes the recipient's encrypted consent element. As described above, the attestation token can include, for each of one or more of the recipients of the request, an encrypted consent element. The encrypted consent element for a recipient can include an encrypted version of a set of data that has been encrypted using a public key of the recipient. This set of data can include a payload that includes the user consent settings for the recipient, the same public key as the attestation token (or a hash or other derivative thereof), optionally a third-party cookie of the recipient that has been stored on the client device, and a digital signature of the rest of the set of data. This digital signature can be generated using the same public key included in the encrypted consent element and the attestation token. Example processes for determining whether an attestation token includes a recipient's encrypted consent element are illustrated in FIGS. 5 and 6 and described below.

In some implementations, if the attestation token includes the recipient's encrypted consent element, the integrity of the request can be classified as valid (414). If not, the integrity of the request can be classified as invalid. Consent elements for entities do not always need to be encrypted. For example, in some implementations, when user changes consent, the web browser, native application or the operating system of the device may send a dedicated request to one entity over Hypertext Transfer Protocol Secure (HTTPS). Within the request, the attestation token carries the user consent element applicable only to the entity.

FIGS. 5 and 6 illustrate processes for determining the integrity of requests that include encrypted consent elements for entities. If the encrypted consent element for a recipient only contains the recipient's encrypted consent element, the encryption result is stable. Intermediaries or others that may gain access to the requests can rely on the encrypted consent element as a stable identifier to track a user. To prevent such tracking, randomness can be introduced to the encryption process such that the encryption consent element for a given recipient and a given client device is specific to each request. The processes 500 and 600 are two example ways of introducing such randomness.

FIG. 5 is a flow diagram that illustrates another example process 500 for determining whether the integrity of a request is valid using an attestation token. The process 500 can be implemented, for example, by a recipient of the request, such as a publisher 130, a digital component distribution system 150, a digital component partner 157, or a digital component provider 160 of FIG. 1. Operations of the process 500 can also be implemented as instructions stored on non-transitory computer readable media, and execution of the instructions by one or more data processing apparatus can cause the one or more data processing apparatus to perform the operations of the process 500.

In this example process 500, a request includes an attestation token that has a group of encrypted consent elements, e.g., one for each of multiple recipients. The encrypted consent element for each recipient is an encrypted version of a combination of the recipient's consent element (e.g., the public key, the payload, and the optional third-party cookie) and a cryptographic hash of the digital signature of the set of data included in the attestation token. That is, the web browser that sends the request can use a given recipient's public key to encrypt a combination of the recipient's consent element and the cryptographic hash of the digital signature. The cryptographic hash of the digital signature for each recipient can be calculated by applying a cryptographic algorithm or hash function, e.g., SHA256, over the digital signature. This cryptographic hash introduces the randomness that makes the encrypted consent element specific to each request and also cryptographically binds the encrypted consent element to the rest of the attestation token.

A cryptographic hash of a digital signature of a set of data in an attestation token of a request is calculated (502). The cryptographic hash of the digital signature can be calculated using a cryptographic hash algorithm adopted by the browser, operating system, or other trusted program.

A first encrypted consent element in the group of encrypted consent elements is accessed (504). In this example, each encrypted consent element is accessed one by one. In other implementations, multiple encrypted consent elements can be accessed and processed in parallel, e.g., using multiple threads or multiple processors.

The encrypted consent element is decrypted (506). The encrypted consent element can be decrypted using the recipient's private key that corresponds to the recipient's public key used to encrypt its consent element.

A determination is made whether the decrypted consent element includes a portion that matches the cryptographic hash of the digital signature calculated in operation 502 (508). For example, the cryptographic hash of the digital signature can be compared to the decrypted consent element to determine whether there is a match between the cryptographic hash and a portion of the decrypted consent element.

If there is no match, a determination is made whether the currently accessed consent element is the last encrypted consent element included in the group (510). If the currently accessed consent element is not the last encrypted consent element in the group, the next encrypted consent element is accessed (512). Operations 506 and 508 are then performed on this consent element.

For each decrypted consent element that includes a portion that matches the cryptographic hash of the digital signature, a determination can be made whether the decrypted consent element includes a portion that matches a cookie identifier of the recipient. For example, the recipient can perform a lookup operation on its stored user data using the data in the encrypted consent element to determine if there is a match to a stored cookie identifier in the user data. If so, the recipient can determine that the cookie in the consent element is for that cookie identifier. If not, the recipient can store the new cookie identifier and start collecting user data using the cookie identifier in accordance with the user consent settings for the user.

If a decrypted consent element includes a portion that matches the cryptographic hash of the digital signature in operation 508, the request is classified as valid (516). If none of the decrypted consent elements include a portion that matches the cryptographic hash of the digital signature in operation 508, the request is classified as invalid (514).

FIG. 6 is a flow diagram that illustrates another example process 600 for determining whether the integrity of a request is valid using an attestation token. The process 600 can be implemented, for example, by a recipient of the request, such as a publisher 130, a digital component distribution system 150, a digital component partner 157, or a digital component provider 160 of FIG. 1. Operations of the process 600 can also be implemented as instructions stored on non-transitory computer readable media, and execution of the instructions by one or more data processing apparatus can cause the one or more data processing apparatus to perform the operations of the process 600.

In this example process 600, a request includes an attestation token that has a group of encrypted consent elements, e.g., one for each of multiple recipients. The encrypted consent element for each recipient is an encrypted version of the recipient's consent element using the digital signature, or the cryptographic hash of the digital signature, of the set of data included in the attestation token as an encryption initialization vector. The use of the encryption initialization vector introduces the randomness that makes the encrypted consent element specific to each request and also cryptographically binds the encrypted consent element to the rest of the attestation token.

A cryptohash of a digital signature of a set of data in an attestation token of a request is calculated (602). The cryptohash of the digital signature can be calculated using the same cryptographic hash algorithm adopted by the browser.

A first encrypted consent element in the group of encrypted consent elements is accessed (604). In this example, each encrypted consent element is accessed one by one. In other implementations, multiple cookie elements can be accessed and processed in parallel, e.g., using multiple threads or multiple processors.

The encrypted consent element is decrypted (606). The encrypted consent element can be decrypted using the recipient's private key that corresponds to the recipient's public key used to encrypt its consent element and the digital signature, or the cryptographic hash of the digital signature, included in the attestation token as the encryption initialization vector.

A determination is made whether the decrypted consent element matches an identifier of the recipient (608). If not, a determination is made whether the currently accessed consent element is the last encrypted consent element included in the group (610). If the currently accessed consent element is not the last encrypted consent element in the group, the next encrypted consent element is accessed (612). Operations 606 and 608 are then performed on this consent element.

If a decrypted consent element matches a valid identifier of the recipient, the request is classified as valid (616). If none of the decrypted consent elements match a valid consent identifier of the recipient, the request is classified as invalid (614).

Figure 7:
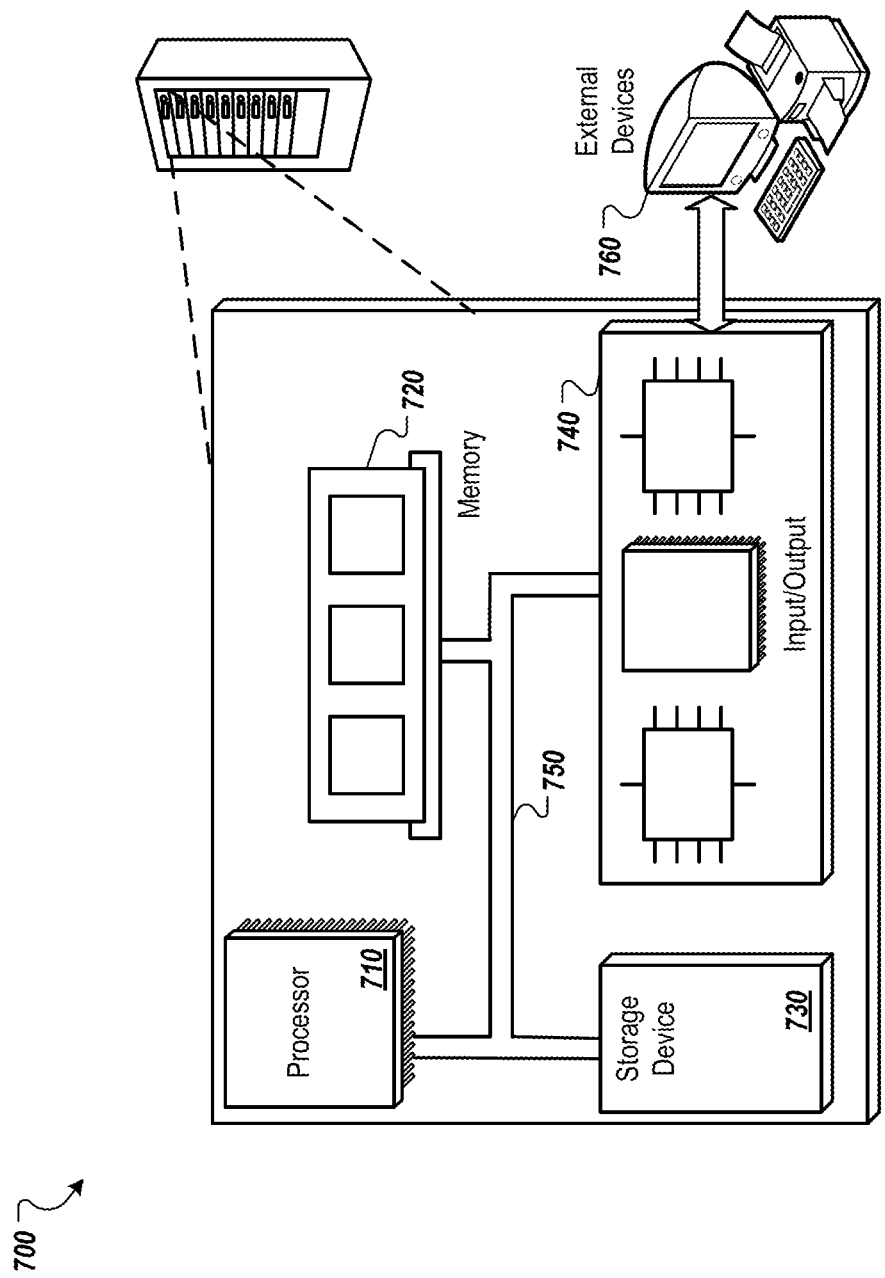
FIG. 7 is a block diagram of an example computer system.

FIG. 7 is a block diagram of an example computer system 700 that can be used to perform operations described above. The system 700 includes a processor 710, a memory 720, a storage device 730, and an input/output device 740. Each of the components 710, 720, 730, and 740 can be interconnected, for example, using a system bus 750. The processor 710 is capable of processing instructions for execution within the system 700. In some implementations, the processor 710 is a single-threaded processor. In another implementation, the processor 710 is a multi-threaded processor. The processor 710 is capable of processing instructions stored in the memory 720 or on the storage device 730.

The memory 720 stores information within the system 700. In one implementation, the memory 720 is a computer-readable medium. In some implementations, the memory 720 is a volatile memory unit. In another implementation, the memory 720 is a non-volatile memory unit.

The storage device 730 is capable of providing mass storage for the system 700. In some implementations, the storage device 730 is a computer-readable medium. In various different implementations, the storage device 730 can include, for example, a hard disk device, an optical disk device, a storage device that is shared over a network by multiple computing devices (e.g., a cloud storage device), or some other large capacity storage device.

The input/output device 740 provides input/output operations for the system 700. In some implementations, the input/output device 740 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to external devices 760, e.g., keyboard, printer and display devices. Other implementations, however, can also be used, such as mobile computing devices, mobile communication devices, set-top box television client devices, etc.

Although an example processing system has been described in FIG. 7, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A computer-implemented method comprising:
receiving, from a client device, a request including an attestation token, the attestation token including:
a set of data that includes at least:
a user identifier that uniquely identifies a user of the client device;
a token creation time that indicates a time at which the attestation token was created;
payload data that includes user consent data specifying whether one or more entities that receive the attestation token are eligible to use data of the user; and
an action to be performed in response to the request; and
a digital signature of at least a portion of the set of data, including at least the user identifier and the token creation time; and
verifying an integrity of the request using the attestation token, including:
determining whether the token creation time is within a threshold duration of a time at which the request was received;
determining, using the digital signature, whether the set of data was modified after the attestation token was created; and
determining that the integrity of the request is valid based at least on determination that the token creation time is within the threshold duration of the time at which the request was received and a determination that the set of data has not been modified since the attestation token was created;
performing the action in response to determining that the integrity of the request is valid, wherein performing the action comprises:
determining that the action is a request for one or more digital components;
selecting the one or more digital components in accordance with the user consent data; and
providing the one or more digital components to the client device.

2. The computer-implemented method of claim 1, wherein performing the action comprises:
determining that the user consent data indicates that the data of the user is to be deleted; and
deleting the data of the user.

3. The computer-implemented method of claim 1, wherein performing the action comprises:
determining that the user consent data specifies one or more authorized actions that are authorized by the user to be performed by a given entity using the data of the user; and
preventing the given entity from using the data of the user for actions other than the specified one or more authorized actions.

4. The computer-implemented method of claim 1, wherein:
the set of data includes payload data that includes the user consent data;
the payload data further comprises a domain to which the action applies; and
the method further comprises determining that the action is a user consent action to modify previous consent given by the user for the domain to use the data of the user.

5. The computer-implemented method of claim 1, wherein:

the payload data further comprises a domain to which the action applies.

6. The computer-implemented method of claim 1, wherein the digital signature is a signature of the user identifier, the token creation time, and the user consent data.

7. The computer-implemented method of claim 1, wherein the set of data further comprises at least one of a device integrity token or a browser integrity token.

8. The computer-implemented method of claim 1, wherein:
the one or more entities comprises multiple recipient entities to which the request is provided; and
the user consent data includes, for each recipient entity, an encrypted consent element that includes user consent data specific to the recipient entity, wherein the encrypted consent element for each recipient entity is encrypted using a public key of the recipient entity.

9. The computer-implemented method of claim 1, further comprising:
receiving a second request that includes a second user identifier and a second token creation time;
determining that the second user identifier of the second request matches the user identifier of the request;
determining that the second token creation time of the second request matches the token creation time of the request; and
in response to determining that the second user identifier of the second request matches the user identifier of the request and that the second token creation time of the second request matches the token creation time of the request, determining that either the second request is a duplicate of the request or a replay attack has occurred.

10. A system, comprising:
one or more processors; and
one or more memories having stored thereon computer readable instructions configured to cause the one or more processors to perform operations comprising:
receiving, from a client device, a request including an attestation token, the attestation token including:
a set of data that includes at least:
a user identifier that uniquely identifies a user of the client device;
a token creation time that indicates a time at which the attestation token was created;
payload data that includes user consent data specifying whether one or more entities that receive the attestation token are eligible to use data of the user; and
an action to be performed in response to the request; and
a digital signature of at least a portion of the set of data, including at least the user identifier and the token creation time; and
verifying an integrity of the request using the attestation token, including:
determining whether the token creation time is within a threshold duration of a time at which the request was received;
determining, using the digital signature, whether the set of data was modified after the attestation token was created;
determining that the integrity of the request is valid based at least on determination that the token creation time is within the threshold duration of the time at which the request was received and a determination that the set of data has not been modified since the attestation token was created; and
performing the action in response to determining that the integrity of the request is valid, wherein performing the action comprises:
determining that the action is a request for one or more digital components;
selecting the one or more digital components in accordance with the user consent data; and
providing the one or more digital components to the client device.

11. The system of claim 10, wherein performing the action comprises:
determining that the user consent data indicates that the data of the user is to be deleted; and
deleting the data of the user.

12. The system of claim 10, wherein performing the action comprises:
determining that the user consent data specifies one or more authorized actions that are authorized by the user to be performed by a given entity using the data of the user; and
preventing the given entity from using the data of the user for actions other than the specified one or more authorized actions.

13. The system of claim 10, wherein:
the set of data includes payload data that includes the user consent data;
the payload data further comprises a domain to which the action applies; and
the operations comprise determining that the action is a user consent action to modify previous consent given by the user for the domain to use the data of the user.

14. The system of claim 10, wherein:
the payload data further comprises a domain to which the action applies.

15. The system of claim 10, wherein the digital signature is a signature of the user identifier, the token creation time, and the user consent data.

16. The system of claim 10, wherein the set of data further comprises at least one of a device integrity token or a browser integrity token.

17. The system of claim 10, wherein:
the one or more entities comprises multiple recipient entities to which the request is provided; and
the user consent data includes, for each recipient entity, an encrypted consent element that includes user consent data specific to the recipient entity, wherein the encrypted consent element for each recipient entity is encrypted using a public key of the recipient entity.

18. The system of claim 10, wherein the operations comprise:
receiving a second request that includes a second user identifier and a second token creation time;
determining that the second user identifier of the second request matches the user identifier of the request;
determining that the second token creation time of the second request matches the token creation time of the request; and
in response to determining that the second user identifier of the second request matches the user identifier of the request and that the second token creation time of the second request matches the token creation time of the request, determining that either the second request is a duplicate of the request or a replay attack has occurred.

19. A non-transitory computer readable medium storing instructions that upon execution by one or more computers cause the one or more computers to perform operations comprising:
- receiving, from a client device, a request including an attestation token, the attestation token including:
  - a set of data that includes at least:
    - a user identifier that uniquely identifies a user of the client device;
    - a token creation time that indicates a time at which the attestation token was created;
    - payload data that includes user consent data specifying whether one or more entities that receive the attestation token are eligible to use data of the user; and
    - an action to be performed in response to the request; and
  - a digital signature of at least a portion of the set of data, including at least the user identifier and the token creation time; and
- verifying an integrity of the request using the attestation token, including:
  - determining whether the token creation time is within a threshold duration of a time at which the request was received;
  - determining, using the digital signature, whether the set of data was modified after the attestation token was created; and
  - determining that the integrity of the request is valid based at least on determination that the token creation time is within the threshold duration of the time at which the request was received and a determination that the set of data has not been modified since the attestation token was created; and
- performing the action in response to determining that the integrity of the request is valid, wherein performing the action comprises:
  - determining that the action is a request for one or more digital components;
  - selecting the one or more digital components in accordance with the user consent data; and
  - providing the one or more digital components to the client device.

20. The non-transitory computer readable medium of claim 19, wherein performing the action comprises:
- determining that the user consent data indicates that the data of the user is to be deleted; and
- deleting the data of the user.

* * * * *